US011061658B2

(12) United States Patent
Seki (10) Patent No.: US 11,061,658 B2
(45) Date of Patent: Jul. 13, 2021

(54) PRIORITIZED UPGRADE OF VEHICLES (71) Applicant: Sumitomo Electric Industries, Ltd., Osaka (JP)

(72) Inventor: Ryusuke Seki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 41 days.

(21) Appl. No.: 16/080,863

(22) PCT Filed: Oct. 11, 2016

(86) PCT No.: PCT/JP2016/080064
§ 371 (c)(1),
(2) Date: Aug. 29, 2018

(87) PCT Pub. No.: WO2017/149823
PCT Pub. Date: Sep. 8, 2017

(65) Prior Publication Data
US 2019/0050219 A1 Feb. 14, 2019

(30) Foreign Application Priority Data

Mar. 2, 2016 (JP) .............................. JP2016-039879

(51) Int. Cl.
H04W 4/00 (2018.01)
G06F 8/65 (2018.01)
G06F 11/00 (2006.01)
G06F 13/00 (2006.01)
G06F 9/445 (2018.01)
(Continued)

(52) U.S. Cl.
CPC ............... G06F 8/65 (2013.01); B60R 16/02 (2013.01); G06F 9/445 (2013.01); G06F 11/00 (2013.01);
(Continued)

(58) Field of Classification Search
CPC . G06F 8/65; G06F 11/00; G06F 9/445; G06F 13/00; H04L 67/34; H04L 67/12; H03W 4/48; B60R 16/02
See application file for complete search history.

(56) References Cited

U.S. PATENT DOCUMENTS 7,516,450 B2* 4/2009 Ogura ..................... H04L 29/06
717/168
2005/0050538 A1 3/2005 Kawamata et al.
(Continued)

FOREIGN PATENT DOCUMENTS

CN 103354991 A 10/2013
JP 2001-067232 A 3/2001
(Continued)

Primary Examiner — Lewis A Bullock, Jr.
Assistant Examiner — Mohammad H Kabir
(74) Attorney, Agent, or Firm — Baker Botts L.L.P.; Michael A. Sartori (57) ABSTRACT A system according to one aspect of the present disclosure is a program updating system including a plurality of control devices installed in a vehicle, and a gateway capable of performing in-vehicle communication with the plurality of control devices. The gateway includes: a communication unit that receives a plurality of update programs for the control devices from an external device; a storage unit that stores therein the received plurality of update programs; an in-vehicle communication unit that transmits the stored plurality of update programs to the corresponding control devices, respectively; and a processing unit that prioritizes storage of a first program defined below into the storage unit over storage of a second program defined below into the storage unit.
First program: update programs of a plurality of control devices that require simultaneous updating
Second program: an update program of a control device that does not require simultaneous updating.

8 Claims, 7 Drawing Sheets (51) Int. Cl.
    *B60R 16/02*   (2006.01)
    *H04W 4/48*   (2018.01)
    *H04L 29/08*   (2006.01)

(52) U.S. Cl.
    CPC .............. *G06F 13/00* (2013.01); *H04L 67/12*
        (2013.01); *H04L 67/34* (2013.01); *H04W 4/48*
                                                (2018.02)

(56) References Cited

U.S. PATENT DOCUMENTS

| | | | | |
|---|---|---|---|---|
| 2012/0106446 | A1* | 5/2012 | Yousefi | B60R 16/03 |
| | | | | 370/328 |
| 2015/0178070 | A1* | 6/2015 | Doi | G06F 8/61 |
| | | | | 717/172 |
| 2015/0286475 | A1* | 10/2015 | Vangelov | G06F 8/71 |
| | | | | 717/170 |
| 2016/0202966 | A1* | 7/2016 | Vangelov | G06F 8/654 |
| | | | | 717/172 |
| 2016/0306624 | A1* | 10/2016 | Vangelov | G06F 8/654 |

FOREIGN PATENT DOCUMENTS

| | | | |
|---|---|---|---|
| JP | 2005-078324 A | 3/2005 | |
| JP | 2006-298260 A | 11/2006 | |
| JP | 2007-065856 A | 3/2007 | |
| JP | 2007-213189 A | 8/2007 | |
| JP | 2010-198155 A | 9/2010 | |
| JP | 2012-091755 A | 5/2012 | |
| WO | 2012/061625 A2 | 5/2012 | |
| WO | WO-2016147766 A1 * | 9/2016 | .............. G06F 11/00 |

* cited by examiner

PRIORITIZED UPGRADE OF VEHICLES

TECHNICAL FIELD

The present invention relates to a program updating system, a program updating method, and a computer program.

This application claims priority on Japanese Patent Application No. 2016-039879 filed on Mar. 2, 2016, the entire contents of which are incorporated herein by reference.

BACKGROUND ART

For example, Patent Literature 1 and Patent Literature 2 disclose a technique in which a gateway of an on-vehicle communication device or the like receives an update program, from a management server, and an ECU (Electronic Control Unit) overwrites the old version of a control program with the new version of the control program by using the received update program, thereby remotely executing program updating for each ECU in the vehicle through wireless communication.

CITATION LIST

Patent Literature

PATENT LITERATURE 1: Japanese Laid-Open Patent Publication No. 2007-65856
PATENT LITERATURE 2: Japanese Laid-Open Patent Publication No. 2010-198155

SUMMARY OF INVENTION (1) A system according to one aspect of the present disclosure is a program updating system including a plurality of control devices installed in a vehicle, and a relay device capable of performing in-vehicle communication with the plurality of control devices. The relay device includes: a communication unit configured to receive a plurality of update programs for the control devices from an external device; a storage unit configured to store therein the received plurality of update programs; an in-vehicle communication unit configured to transmit the stored plurality of update programs to the corresponding control devices, respectively; and a processing unit configured to prioritize storage of a first program defined below into the storage unit over storage of a second program defined below into the storage unit.

First program: a plurality of update programs between which operation check after updating has been made Second program: an update program that enables independent updating (4) A method according to one aspect of the present disclosure is a program updating method executed by a relay device capable of performing in-vehicle communication with a plurality of control devices installed in a vehicle. The method includes the steps of: receiving a plurality of update programs for the control devices from an external device; storing the received plurality of update programs; transmitting the stored plurality of update programs to the corresponding control devices, respectively; and prioritizing storage of the first program into a storage unit over storage of the second program into the storage unit.

(5) A computer program according to one aspect of the present disclosure is a computer program for causing a computer to function as a relay device capable of performing in-vehicle communication with a plurality of control devices installed in a vehicle. The computer program includes the steps of: receiving a plurality of update programs for the control devices from an external device; storing the received plurality of update programs; transmitting the stored plurality of update programs to the corresponding control devices, respectively; and prioritizing storage of the first program into a storage unit over storage of the second program into the storage unit.

DESCRIPTION OF EMBODIMENTS

Problems to be Solved by the Present Disclosure

In a case where control programs of a plurality of ECUs installed in a vehicle are simultaneously updated, a gateway needs to simultaneously store, in a storage unit, all of a plurality of update programs received from an external device such as a management server.

However, for example, if other update programs not required for the simultaneous updating have already been stored in a memory region, a free memory region for the update programs for the simultaneous updating becomes insufficient, which may cause a simultaneous update sequence for the plurality of ECUs to be unexecutable.

Considering the conventional problems described above, an object of the present disclosure is to provide a program updating system, etc. capable of executing simultaneous updating for a plurality of control devices even when a free memory capacity of a gateway is insufficient.

Effect of the Disclosure

According to this disclosure, it is possible to execute simultaneous updating for a plurality of control devices even when a free memory capacity of a gateway is insufficient.

Description of Embodiments

Hereinafter, a summary of the present disclosure will be listed and described.

(1) A program updating system according to the present embodiment is a program updating system including a plurality of control devices installed in a vehicle, and a relay device capable of performing in-vehicle communication with the plurality of control devices. The relay device includes: a communication unit configured to receive a plurality of update programs for the control devices from an external device; a storage unit configured to store therein the received plurality of update programs; an in-vehicle communication unit configured to transmit the stored plurality of update programs to the corresponding control devices, respectively; and a processing unit configured to prioritize storage of a first program defined below into the storage unit over storage of a second program defined below into the storage unit.

First program: a plurality of update programs between which operation check after updating has been made Second program: an update program that enables independent updating According to the program updating system of the present embodiment, since the processing unit of the relay device prioritizes storage of the first program into the storage unit over storage of the second program into the storage unit, the plurality of update programs (first program) between which operation check after updating has been made can be reliably stored in the storage unit.

Therefore, even when the free memory capacity of the relay device is insufficient, updating for the plurality of control devices whose operations have been cheked can be executed.

(2) For example, in the program updating system according to the present embodiment, when the first program scheduled to be downloaded is not present but the second program is present in the storage unit, and then if the free memory capacity at present is smaller than the data size of the first program scheduled to be downloaded, the processing unit may cause the communication unit to execute reception of the first program scheduled to be downloaded after the second program has been deleted.

In this case, since reception of the first program is executed after the second program has been deleted, the first program can be stored in the storage unit more reliably.

(3) In the program updating system according to the present embodiment, when the first and second programs scheduled to be downloaded are not present in the storage unit, and then if the free memory region at present is smaller than the total data size of the first program and the second program scheduled to be downloaded, the processing unit may cause the communication unit to execute preferential reception of the first program scheduled to be downloaded.

In this case, since preferential reception of the first program is executed, the first program can be stored in the storage unit more reliably.

In the case where an update program of high emergency level is distributed from a server because of recall or the like, this update program may be downloaded in preference to the first program and the second program.

For example, when the file size of the update program of high emergency level is greater than the free memory region, the second program that is low in priority is deleted. If the free memory capacity is still insufficient even after the second program has been deleted, the first program is deleted, whereby the update program of high emergency level can be downloaded with the highest priority.

(4) A program updating method according to the present embodiment relates to a program updating method executed by the relay device included in the program updating system according to any one of the above (1) to (3).

Therefore, the program updating method according to the present embodiment provides the same advantageous effects as those of the program updating system according to any one of the above (1) to (3).

(5) A computer program according to the present embodiment relates to a computer program for causing a computer to function as a relay device included in the program updating system according to any one of the above (1) to (3).

Therefore, the computer program according to the present embodiment provides the same advantageous effects as those of the program updating system according to any one of the above (1) to (3).

Detailed Description of Embodiment

Hereinafter, an embodiment of the present disclosure will be described with reference to the drawings. At least some parts of the embodiment described below may be combined together as desired.

Overall Configuration of System

Figure 1:
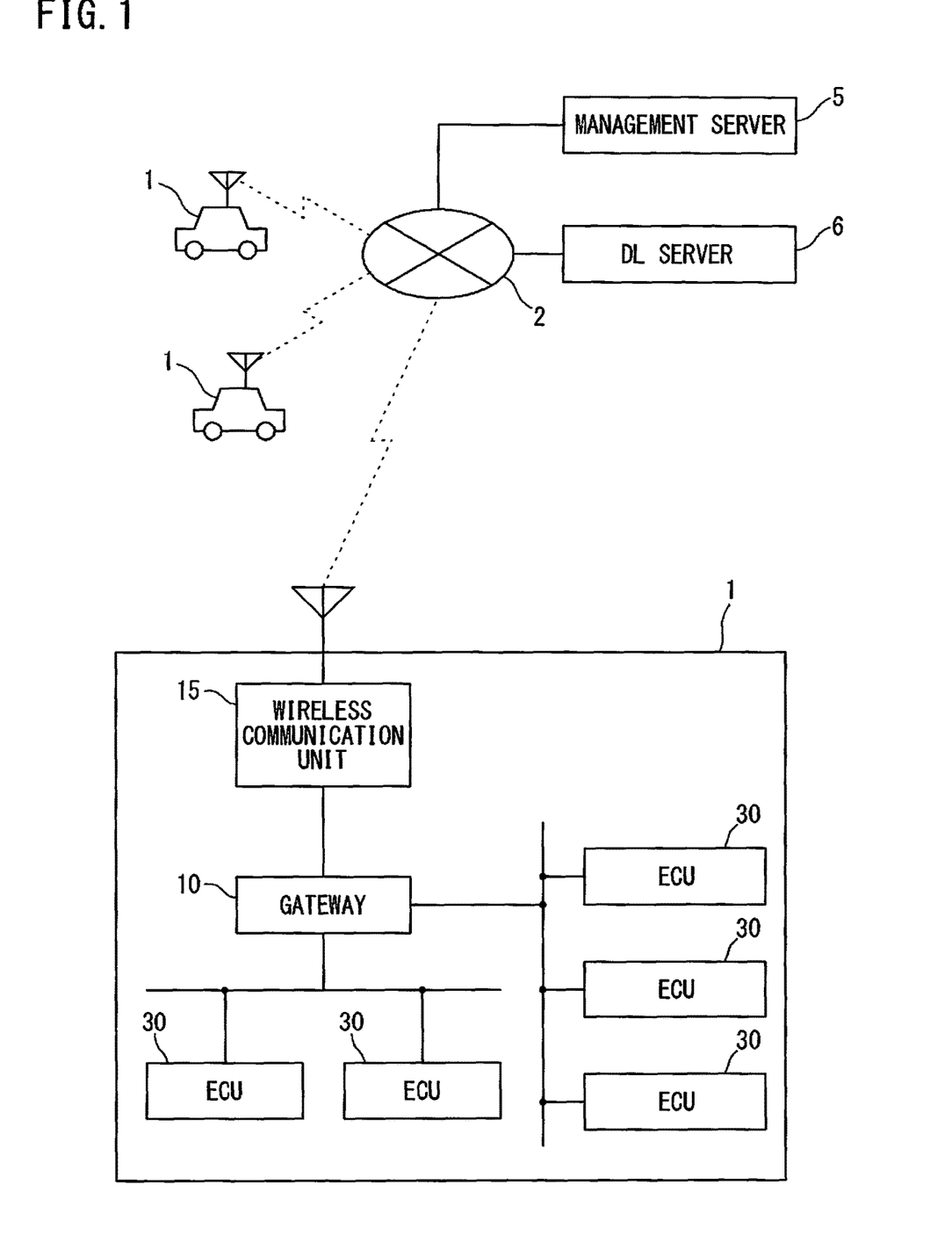
FIG. 1 is a diagram showing an overall configuration of a program updating system according to an embodiment of the present disclosure.

FIG. 1 is a diagram showing an overall configuration of a program updating system according to an embodiment of the present disclosure.

As shown in FIG. 1, the program updating system of this embodiment includes vehicles 1, a management server 5, and a DL (download) server 6 which are able to communicate with each other via a wide-area communication network 2.

The management server 5 and the DL server 6 are operated by, for example, the automobile manufacturer of the vehicles 1, and are able to communicate with large numbers of vehicles 1 owned by users registered as members in advance.

Each vehicle 1 is equipped with a gateway 10, a plurality of ECUs 30, and various on-vehicle devices (not shown) controlled by the respective ECUs 30.

A plurality of communication groups, each being formed by a plurality of ECUs 30 bus-connected to a common in-vehicle communication line, are present in the vehicle 1, and the gateway 10 relays communication between the communication groups. Therefore, a plurality of in-vehicle communication lines are connected to the gateway 10.

The gateway 10 is communicably connected to the wide-area communication network 2 such as a mobile phone network. The gateway 10 transmits, to the ECUs 30, information received from external devices such as the management server 5 and the DL server 6 through the wide-area communication network 2.

The gateway 10 transmits information obtained from the ECUs 30 to the external devices such as the management server 5 through the wide-area communication network 2.

FIG. 1 shows an exemplary case where the gateway 10 directly communicates with the external devices. However, another communication device may be connected to the gateway 10, and the gate way 10 may communicate with the external devices via the other communication device.

Examples of the other communication device connected to the gateway 10 may include a mobile phone, a smart phone, a tablet-type terminal, and a notebook PC (Personal Computer), which are possessed by the user of the vehicle.

In the program updating system shown in FIG. 1, the management server 5 and the DL server 6 are configured as separate servers. However, these serves 5 and 6 may be configured as a single server unit.

Internal Configuration of Gateway

Figure 2:
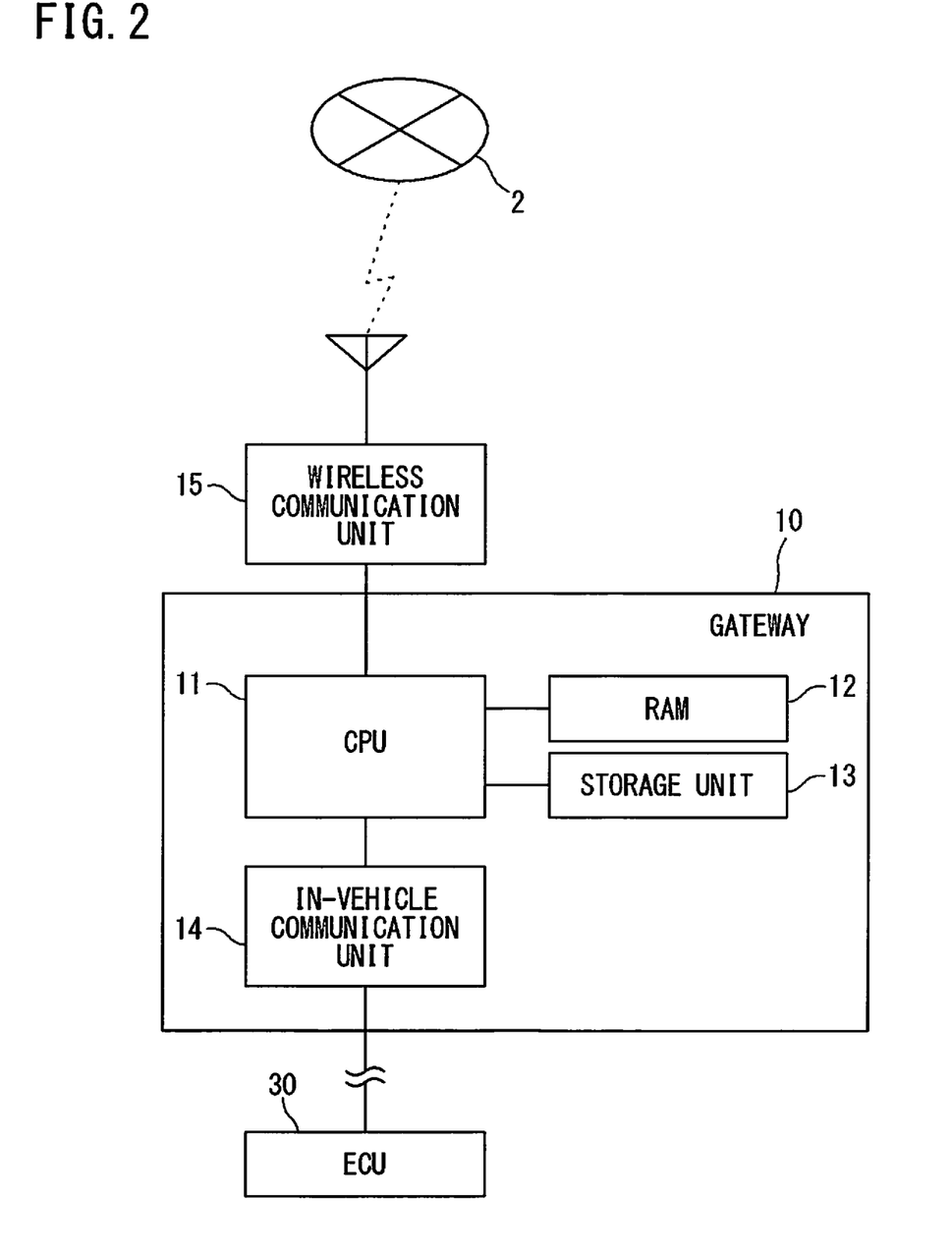
FIG. 2 is a block diagram showing an internal configuration of a gateway.

FIG. 2 is a block diagram showing the internal configuration of the gateway 10.

As shown in FIG. 2, the gateway 10 includes a CPU (Central Processing Unit) 11, an RAM (Random Access Memory) 12, a storage unit 13, an in-vehicle communication unit 14, and the like. Although the gateway 10 is connected to the wireless communication unit 15 via the in-vehicle communication line, the gateway 10 and the wireless communication unit 15 may be configured as a single unit.

The CPU 11 causes the gateway 10 to function as a relay device for relaying various kinds of information, by reading out one or a plurality of programs stored in the storage unit 13 to the RAM 12 and executing the read programs.

The CPU 11 can execute a plurality of programs in parallel by switching between the plurality of programs in a time sharing manner, for example. The CPU 11 may be a CPU representing a plurality of CPU groups. In this case, a function to be implemented by the CPU 11 is a function to be implemented by the plurality of CPU groups in cooperation with each other. The RAM 12 consists of a memory element such as an SRAM (Static RAM) or a DRAM (Dynamic RAM), and temporarily stores therein programs to be executed by the CPU 11, data required in executing the programs, and the like.

A computer program to be executed by the CPU 11 can be transferred in a state of being recorded in a well-known recording medium such as a CD-ROM or a DVD-ROM, or may be transferred by data transmission (download) from a computer device such as a server computer.

In this aspect, the same applies to a computer program to be executed by a CPU 31 of the ECU 30 (refer to FIG. 3) described later, and a computer program to be executed by a CPU 51 of the management server 5 (refer to FIG. 4) described later.

The storage unit 13 consists of, for example, a nonvolatile memory element such as a flash memory or an EEPROM (Electrically Erasable Programmable Read Only Memory).

The storage unit 13 has a storage area in which programs to be executed by the CPU 11, data required in executing the programs, and the like are stored. In the storage unit 13, update programs of the respective ECUs 30, received from the DL server 6, and the like are also stored.

The plurality of ECUs 30 are connected to the in-vehicle communication unit 14 via the in-vehicle communication lines arranged in the vehicle 1. The in-vehicle communication unit 14 communicates with the ECUs 30 in accordance with a standard such as CAN (Controller Area Network), CANFD (CAN with Flexible Data Rate), LIN (Local Interconnect Network), Ethernet (registered trademark), or MOST (Media Oriented Systems Transport: MOST is a registered trademark), for example.

The in-vehicle communication unit 14 transmits information provided from the CPU 11 to target ECUs 30, and provides information received from the ECUs 30 to the CPU 11. The in-vehicle communication unit 14 may communicate with the ECUs 30 in accordance with other communication standards that are used for an on-vehicle network, apart from the above communication standards.

The wireless communication unit 15 consists of a wireless communication apparatus including an antenna and a communication circuit that executes transmission/reception of radio signals through the antenna. The wireless communication unit 15 is able to communicate with the external devices when being connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

In the gateway 10, instead of the wireless communication unit 15, a wired communication unit to which another communication device as described above is connected, may be adopted. The wired communication unit has a connector to which a communication device is connected via a communication cable conforming to a standard such as USB (Universal Serial Bus) or RS232C, and performs communication with the other communication device connected thereto via the communication cable.

The wired communication unit transmits information provided from the CPU 11 to the external devices through the other communication device, and provides, to the CPU 11, information received from the external devices via the wide-area communication network 2.

Internal Configuration of ECU

Figure 3:
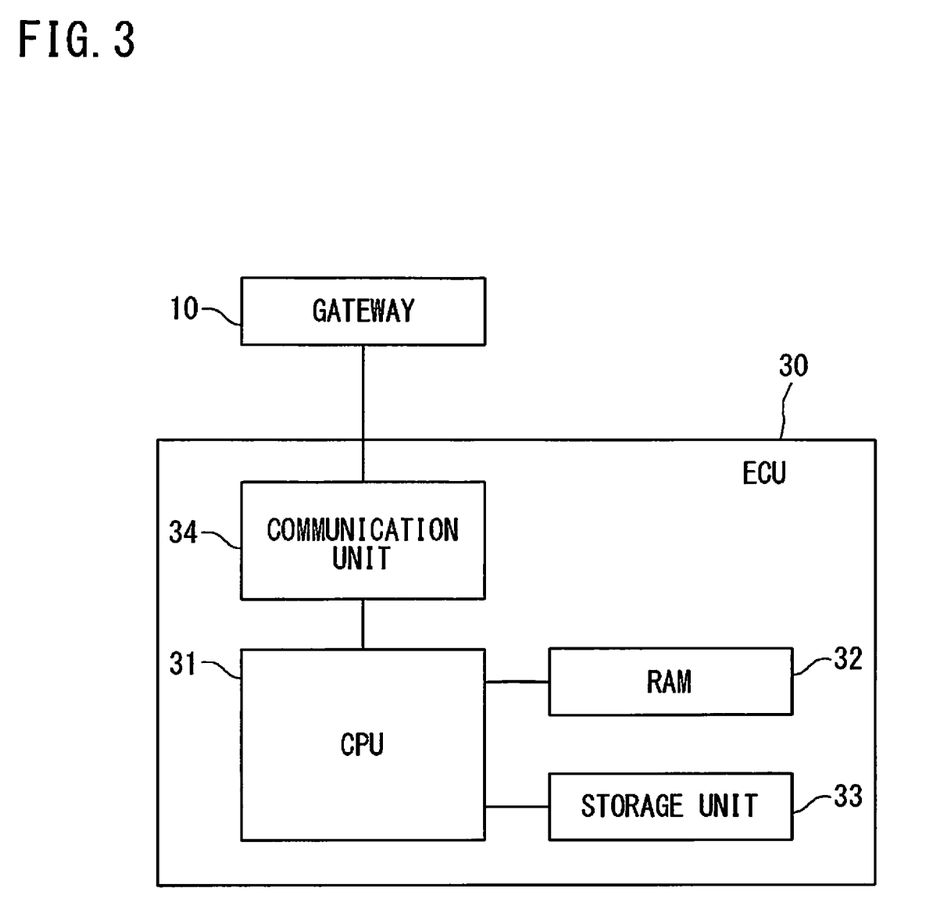
FIG. 3 is a block diagram showing an internal configuration of an ECU.

FIG. 3 is a block diagram showing the internal configuration of an ECU 30.

As shown in FIG. 3, the ECU 30 includes a CPU 31, an RAM 32, a storage unit 33, a communication unit 34, and the like. The ECUs 30 are control devices that individually control a plurality of on-vehicle devices installed in the vehicle 1. Examples of the types of the ECUs 30 include an engine control ECU, a steering control ECU, and a door lock control ECU.

The CPU 31 controls the operation of an on-vehicle device that the CPU 31 is in charge of, by reading out one or a plurality of programs previously stored in the storage unit 33 to the RAM 32 and executing the read programs. The CPU 31 may also be a CPU representing a plurality of CPU groups, and a control to be performed by the CPU 31 may be a control to be performed by the plurality of CPU groups in cooperation with each other.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

Information stored in the storage unit 33 includes, for example, a computer program (hereinafter referred to as "control program") that causes the CPU 31 to execute processing for controlling an on-vehicle device to be controlled.

The gateway 10 is connected to the communication unit 34 via the in-vehicle communication lines arranged in the vehicle 1. The communication unit 34 communicates with the gateway 10 in accordance with a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 in accordance with other communication standards that are used for the on-vehicle network, apart from the above communication standards.

Internal Configuration of Management Server

Figure 4:
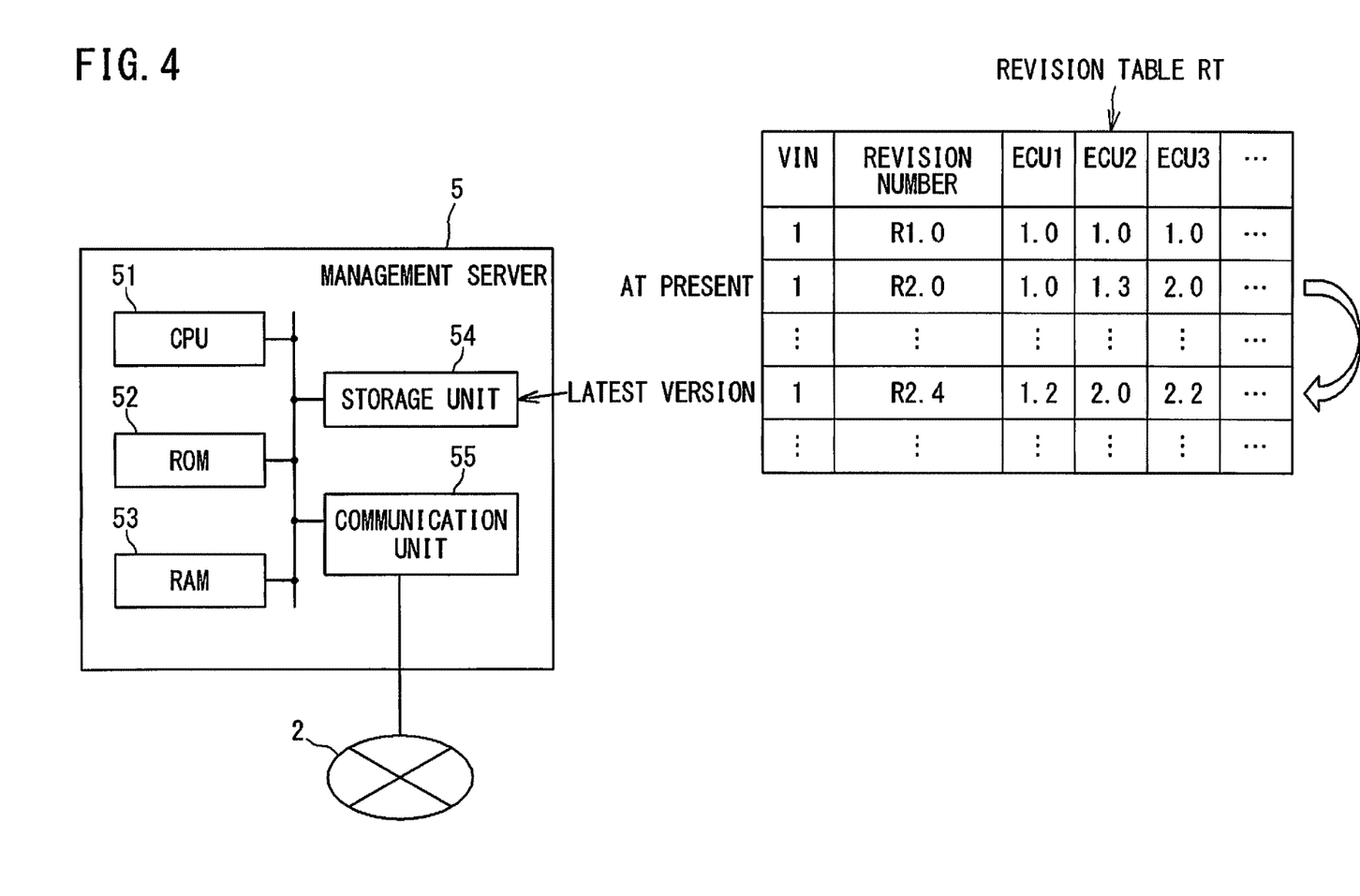
FIG. 4 is a block diagram showing an internal configuration of a management server.

FIG. 4 is a block diagram showing the internal structure of the management server 5.

As shown in FIG. 4, the management server 5 includes a CPU 51, an ROM 52, an RAM 53, a storage unit 54, a communication unit 55, and the like.

By reading out one or a plurality of programs previously stored in the ROM 52 to the RAM 53 and executing the read programs, the CPU 51 controls the operation of each hardware component, and causes the management server 5 to function as an external device that is able to communicate with the gateway 10. The CPU 51 may also be a CPU representing a plurality of CPU groups, and a function to be implemented by the CPU 51 may be a function to be implemented by the plurality of CPU groups in cooperation with each other.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process in accordance with a predetermined communication standard. The communication unit 55 executes the communication process when being connected to the wide-area communication network 2 such as a mobile phone network. The communication unit 55 transmits information provided from the CPU 51 to external devices via the wide-area communication network 2, and provides information received via the wide-area communication network 2 to the CPU 51.

As shown in FIG. 4, information stored in the storage unit 54 includes a revision table RT in which the versions of control programs of ECUs 30 installed in vehicles 1 are recorded (in FIG. 4, identification numbers of ECUs 30 installed in a vehicle 1 having VIN=1 are 1 to 3).

The revision table RT is a table tabulating: vehicle identification numbers (VIN) of vehicles 1; revision numbers as identification information representing revision-up histories of the respective vehicle identification numbers; and the versions of the ECUs 1 to 3 corresponding to the respective revision numbers.

In the revision table RT shown in FIG. 4, the versions of the control programs of the respective ECUs 1 to 3, which are included in the same revision number, indicate that operation check for these control programs has been made by the automobile manufacturer.

For example, in the case of "R2.0" that is the revision number at present, the control program of version 1.0 for the ECU 1, the control program of version 1.3 for the ECU 2, and the control program of version 2.0 for the ECU 3 have been subjected to operation check.

In the case of "R2.4" that is the latest revision number, the control program of version 1.2 for the ECU 1, the control program of version 2.0 for the ECU 2, and the control program of version 2.2 for the ECU 3 have been subjected to operation check.

Accordingly, when the vehicle 1 is revised up from R2.0 to R2.4, version upgrade from 1.0 to 1.2 for the ECU 1, version upgrade from 1.3 to 2.0 for the ECU 2, and version upgrade from 2.0 to 2.2 for the ECU 3 have to be simultaneously performed.

In the revision table RT shown in FIG. 4, only the version information when the vehicle identification number VIN=1 is shown as one example.

However, in the revision table RT held by the management server 5, similar version information to that described above is recorded for each of the vehicle identification numbers (VIN) of all vehicles 1 owned by the registered members of the management server 5. In addition, the DL server 6 has stored therein a plurality of update programs relating to all the ECUs 30.

When being notified, from the gateway 10, of the vehicle identification number and the versions of the present control programs of the ECUs 1 to 3, the CPU 51 collates the notified version information with the latest version regarding the vehicle identification number, which is included in the revision table RT.

When the result of the collation is that the version information of the ECUs 1 to 3 notified from the gateway 10 is not the latest one, the CPU 51 transmits, to the gateway 10, an URL where update programs for update to the latest version are stored, and a download request.

Memory Region for Update Program in Gateway

Figure 5:
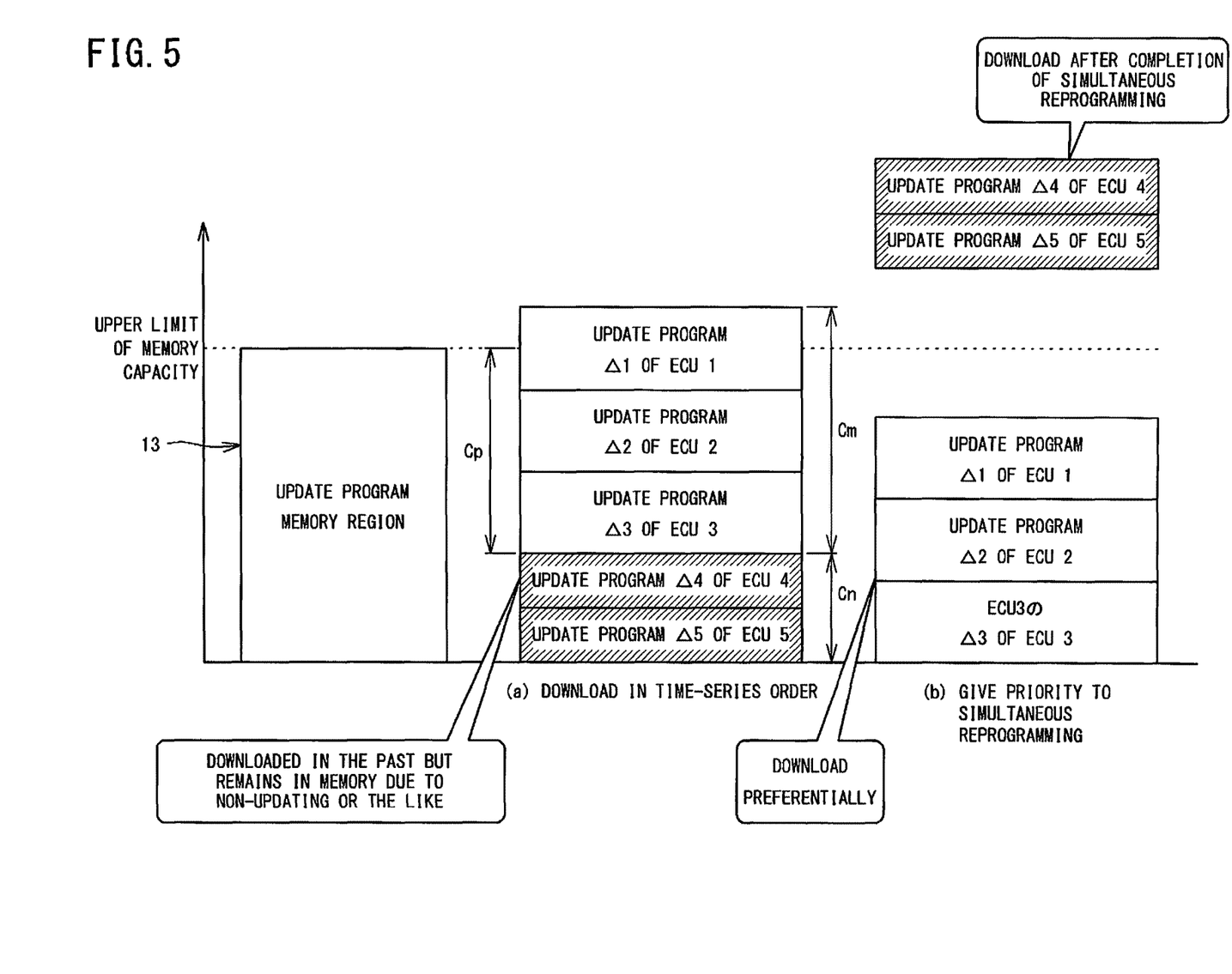
FIG. 5 is a diagram for explaining a memory region of an update program reserved in a storage unit of the gateway.

FIG. 5 is a diagram for explaining a memory region for update programs, reserved in the storage unit 13 of the gateway 10.

In FIG. 5, ECUs 1 to 3 are ECUs 30 that require simultaneous updating of control programs, and ECUs 4 and 5 are ECUs 30 that do not require such simultaneous updating (i.e., ECUs 30 that independently execute updating of control programs). In addition, update programs used for updating of the control programs of the respective ECUs 1 to 5 are "Δ1" to "Δ5", respectively.

As for the update programs Δ1 to Δ5 to be transmitted from the DL server 6, generally, a plurality of update programs are present. The ECUs 1 to 5 may sequentially execute reprograming in accordance with an order specified by a user, emergency levels of updating, or the like. On the other hand, as in the case of simultaneous updating, a plurality of ECUs 1 to 3 may have to simultaneously execute reprogramming.

In the case where simultaneous updating is performed for the plurality of ECUs 1 to 3, all the update programs Δ1 to Δ3 for the ECUs 1 to 3 need to be temporarily stored in a predetermined memory region in the storage unit 13 of the gateway 10.

However, for example, as shown in (a) of FIG. 5, when the update programs Δ1 to Δ5 are simply downloaded in time-series order, since the update programs Δ4 and Δ5 of the ECUs 4 and 5 for non-simultaneous updating have already been stored in the memory region, it is assumed that a free memory region for storing the update programs Δ1 to Δ3 of the ECUs 1 to 3 for simultaneous updating may be insufficient.

In this case, part of the update programs Δ1 to Δ3 of the ECUs 1 to 3 (the update program Δ1 in the case of FIG. 5) overflows the buffer, which makes the simultaneous update sequence for the ECUs 1 to 3 unexecutable.

Therefore, the CPU 11 of the gateway 10 compares the data size (file size) Cm of the update programs Δ1 to Δ3 required for simultaneous updating, with a free memory capacity Cp at present. When Cp<Cm is satisfied, the CPU 11 deletes the update programs Δ4 and Δ5 that do not need simultaneous updating to reserve a free memory region, and then starts download of the update programs Δ1 to Δ3 ((b) of FIG. 5).

Thus, all the update programs Δ1 to Δ3 to be used for simultaneous updating can be stored in a predetermined memory region in the storage unit 13, thereby making the simultaneous update sequence for the ECUs 1 to 3 executable.

The CPU 11 of the gateway 10 again downloads the update programs Δ4 and Δ5 of the ECUs 4 and 5, which have been deleted for capacity reservation, after the simultaneous updating of the ECUs 1 to 3 has ended, and stores the update programs Δ4 and Δ5 in a predetermined memory region in the storage unit 13.

Prioritized Download Process by Gateway

Figure 6:
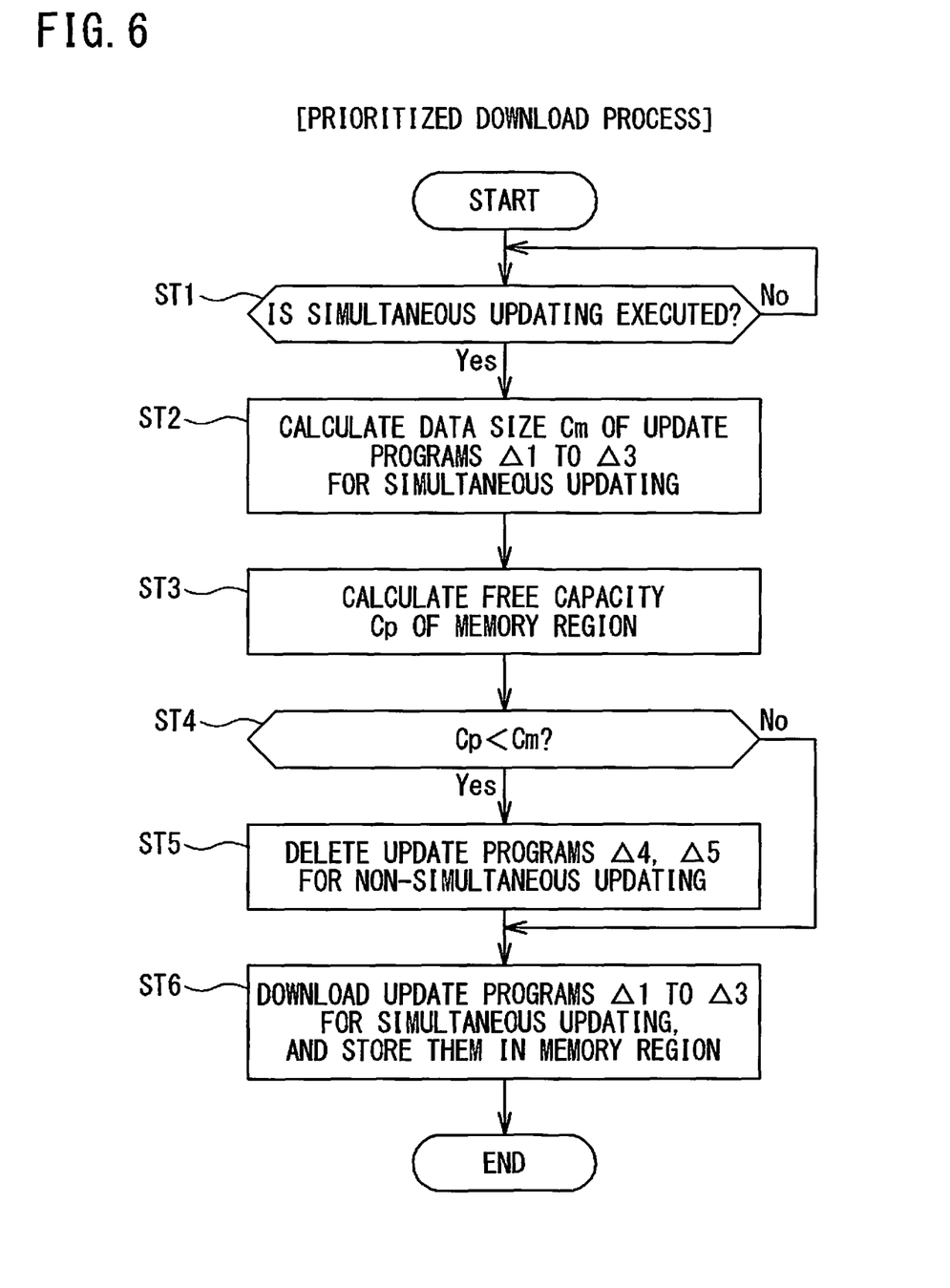
FIG. 6 is a flowchart showing an example of a prioritized download process.

FIG. 6 is a flowchart showing an example of a prioritized download process to be executed by the CPU 11 of the gateway 10.

As shown in FIG. 6, the CPU 11 determines whether or not simultaneous updating is to be executed (step ST1). When simultaneous updating is to be executed, the CPU 11 calculates the data size Cm of the update programs Δ1 to Δ3 to be used for the simultaneous updating (step ST2).

Next, the CPU 11 calculates the free capacity Cp, at present, of the memory region of the storage unit 13 (step ST3), and determines whether or not Cp<Cm is satisfied (step ST4).

When the result of the determination is positive, the CPU 11 deletes the update programs Δ4 and Δ5 for non-simultaneous updating (step ST5), downloads the update programs Δ1 to Δ3 to be used for the simultaneous updating, and stores the update programs Δ1 to Δ3 in the memory region of the storage unit 13 (step ST6).

When the result of the above determination is negative, the CPU 11 downloads the update programs Δ1 to Δ3 to be used for the simultaneous updating without performing deletion of the update programs Δ4 and Δ5 for non-simultaneous updating (step ST5), and stores the update programs Δ1 to Δ3 in the memory region of the storage unit 13 (step ST6).

Prioritized Download Procedure When No Update Program is Stored

While FIG. 5 and FIG. 6 show an exemplary case where the update programs Δ4 and Δ5 have already been stored in the memory region of the storage unit 13, there are cases where no update program Δ4 or Δ5 is present in the memory region.

It is assumed that, in the case where no update program Δ1 to Δ5 is present in the memory region of the storage unit 13, there are update programs Δ1 to Δ5 of five ECUs 1 to 5 to be downloaded now, and among the five ECUs 1 to 5, three ECUs 1 to 3 require simultaneous updating.

Further, it is assumed that the data size of the update programs Δ1 to Δ3 to be used for simultaneous updating is Cm, the data size of the update programs Δ4 and Δ5 for independent updating is Cn, the data size of all the update programs Δ1 to Δ5 is Cd (=Cm+Cn), the memory capacity (=free memory capacity), of the storage unit 13, regarding update programs is Cp, and Cp≥Cm is satisfied.

In this case, when Cp<Cd (=Cm+Cn) is satisfied, and then if the update programs Δ1 to Δ5 of the ECUs 1 to 5 are downloaded discretionarily (e.g., in the time-series order), there is a possibility that a shortage of memory capacity finally occurs, and the update programs Δ1 to Δ3 of the ECUs 1 to 3 cannot be simultaneously stored, which makes simultaneous updating of the ECUs 1 to 3 unexecutable.

Therefore, when the condition of Cp<Cd is satisfied, the CPU 11 of the gateway 10 preferentially downloads the update programs Δ1 to Δ3 of the ECUs 1 to 3 that require simultaneous updating, stores the update programs Δ1 to Δ3 in the storage unit 13, and transmits the stored update programs Δ1 to Δ3 to the respective ECUs 1 to 3, thereby enabling the ECUs 1 to 3 to execute simultaneous updating.

Download of the update programs Δ4 and Δ5 may be performed after the ECUs 1 to 3 have completed the simultaneous updating and the update programs Δ1 to Δ3 have been deleted from the storage unit 13.

Modification of Prioritized Download Process

Figure 7:
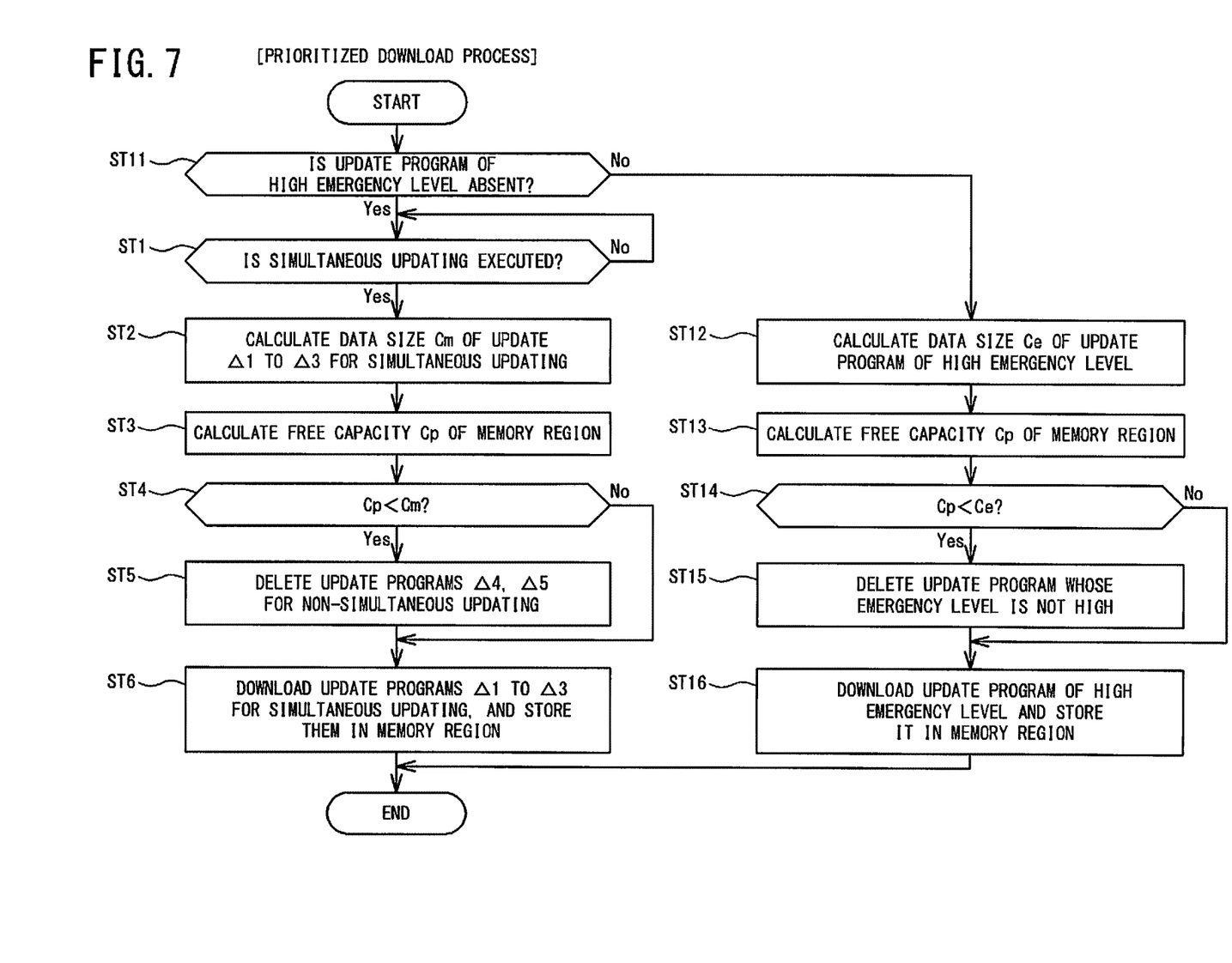
FIG. 7 is a flowchart showing a modification of the prioritized download process.

FIG. 7 is a flowchart showing a modification of the prioritized download process executed by the CPU 11 of the gateway 10.

The modification of FIG. 7 is different from the example of FIG. 6 in that a process of steps ST11 to ST16 is added.

As shown in FIG. 7, the CPU 11 of the gateway 10 first determines whether or not an update program of high emergency level is absent (step ST11).

When the result of the determination is that such an update program is absent, the CPU 11 executes the process of steps ST1 to ST6 (the same flow as FIG. 6). When the result of the determination is that such an update program is present, the CPU 11 executes the process of steps ST12 to ST16.

In the process of steps ST12 to ST16, the CPU 11 calculates a file size Ce of the update program of high emergency level and a free capacity Cp of the memory region (steps ST12 and ST13), and compares them (step ST14).

When Cp<Ce is satisfied, the CPU 11 deletes update programs whose emergency levels are not high (e.g., the update programs Δ4 and Δ5 for non-simultaneous updating which are low in priority: second program) (step ST15), and then downloads the update program of high emergency level (step ST16).

In this case, if Cp<Ce is still satisfied even after the second program has been deleted, the CPU 11 deletes the update programs Δ1 to Δ3 (first program) required for simultaneous updating, which are high in priority, and then downloads the update program of high emergency level, with the highest priority.

If Cp<Ce is not satisfied, the CPU 11 downloads the update program of high emergency level (step ST16) without deleting the update programs whose emergency levels are not high (step ST15).

It is noted that the embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST

1 vehicle
2 wide-area communication network
5 management server
6 DL server
10 gateway (relay device)
11 CPU (processing unit)
12 RAM
13 storage unit
14 in-vehicle communication unit
15 wireless communication unit
30 ECU (control device)
31 CPU
32 RAM
33 storage unit
34 communication unit 51 CPU (processing unit)
52 ROM
53 RAM
54 storage unit
55 communication unit

The invention claimed is:

1. A program updating system comprising a plurality of control devices installed in a vehicle, and a relay device capable of performing in-vehicle communication with the plurality of control devices, wherein
the relay device comprises:
a communication unit configured to receive a plurality of update programs for the control devices from an external device;
a storage unit configured to store therein the received plurality of update programs;
an in-vehicle communication unit configured to transmit the stored plurality of update programs to the corresponding control devices, respectively; and
a processing unit configured to reserve a memory region of the storage unit for a plurality of first programs with priority over a memory region of the storage unit for a second program, wherein
the plurality of the first programs are a plurality of update programs between which operation check after updating has been made, among the plurality of update programs,
the second program is an update program that enables independent updating, among the plurality of update programs, and
when the plurality of the first programs scheduled to be downloaded is not present but the second program is present in the storage unit,
if a free memory region at present is smaller than a data size of the plurality of the first programs scheduled to be downloaded, the processing unit causes the communication unit to execute reception of the plurality of the first programs scheduled to be downloaded, after the second program has been deleted.

2. A program updating method executed by a relay device capable of performing in-vehicle communication with a plurality of control devices installed in a vehicle, the method comprising:
receiving a plurality of update programs for the control devices from an external device;
storing the received plurality of update programs;
transmitting the stored plurality of update programs to the corresponding control devices, respectively; and
reserving a memory region of a storage unit for a plurality of first programs with priority over a memory region of the storage unit for a second program, wherein
the plurality of the first programs are a plurality of update programs between which operation check after updating has been made, among the plurality of update programs,
the second program is an update program that enables independent updating, among the plurality of update programs, and
when the plurality of the first programs scheduled to be downloaded is not present but the second program is present in the storage unit,
if a free memory region at present is smaller than a data size of the plurality of the first programs scheduled to be downloaded,
the receiving comprises receiving the plurality of the first programs scheduled to be downloaded, after the second program has been deleted.

3. A non-transitory computer readable storage medium storing a computer program for causing a computer to function as a relay device capable of performing in-vehicle communication with a plurality of control devices installed in a vehicle, the computer program causing the computer to perform operations comprising:
receiving a plurality of update programs for the control devices from an external device;
storing the received plurality of update programs;
transmitting the stored plurality of update programs to the corresponding control devices, respectively; and
reserving a memory region of a storage unit for a plurality of first programs with priority over a memory region of the storage unit for a second program, wherein
the plurality of the first programs are a plurality of update programs between which operation check after updating has been made, among the plurality of update programs,
the second program is an update program that enables independent updating, among the plurality of update programs, and
when the plurality of the first programs scheduled to be downloaded is not present but the second program is present in the storage unit,
if a free memory region at present is smaller than a data size of the plurality of the first programs scheduled to be downloaded,
the receiving comprises receiving the plurality of the first programs scheduled to be downloaded, after the second program has been deleted.

4. A relay device capable of performing in-vehicle communication with a plurality of control devices installed in a vehicle, comprising:
a communication unit configured to receive a plurality of update programs for the control devices from an external device;
a storage unit configured to store therein the received plurality of update programs;
an in-vehicle communication unit configured to transmit the stored plurality of update programs to the corresponding control devices, respectively; and
a processing unit configured to reserve a memory region of the storage unit for a plurality of first programs with priority over a memory region of the storage unit for a second program, wherein
the plurality of the first programs are a plurality of update programs between which operation check after updating has been made, among the plurality of update programs,
the second program is an update program that enables independent updating, among the plurality of update programs, and
when the plurality of the first programs scheduled to be downloaded is not present but the second program is present in the storage unit,
if a free memory region at present is smaller than a data size of the plurality of the first programs scheduled to be downloaded, the processing unit causes the communication unit to execute reception of the plurality of the first programs scheduled to be downloaded, after the second program has been deleted.

5. A program updating system comprising a plurality of control devices installed in a vehicle, and a relay device capable of performing in-vehicle communication with the plurality of control devices, wherein
the relay device comprises:
a communication unit configured to receive a plurality of update programs for the control devices from an external device;

a storage unit configured to store therein the received plurality of update programs;

an in-vehicle communication unit configured to transmit the stored plurality of update programs to the corresponding control devices, respectively; and a processing unit configured to reserve a memory region of the storage unit for a plurality of first programs with priority over a memory region of the storage unit for a second program, wherein the plurality of the first programs are a plurality of update programs between which operation check after updating has been made, among the plurality of update programs, the second program is an update program that enables independent updating, among the plurality of update programs, when the plurality of the first programs and the second program scheduled to be downloaded are not present in the storage unit, if a free memory region at present is smaller than a total data size of the plurality of the first programs and the second program scheduled to be downloaded, the processing unit causes the communication unit to execute preferential reception of the plurality of the first programs scheduled to be downloaded, and after each of the plurality of the first programs scheduled to be downloaded is transmitted by the in-vehicle communication unit to a corresponding control device of the plurality of control devices, each of the plurality of control devices is updated by a corresponding first program of the plurality of the first programs scheduled to be downloaded, and after the plurality of the first programs stored in the storage unit is subsequently deleted, the processing unit causes the communication unit to execute reception of the second program scheduled to be downloaded.

6. A program updating method executed by a relay device capable of performing in-vehicle communication with a plurality of control devices installed in a vehicle, the method comprising:

receiving a plurality of update programs for the control devices from an external device;

storing the received plurality of update programs;

transmitting the stored plurality of update programs to the corresponding control devices, respectively; and reserving a memory region of a storage unit for a plurality of first programs with priority over a memory region of the storage unit for a second program, wherein the plurality of the first programs are a plurality of update programs between which operation check after updating has been made, among the plurality of update programs, the second program is an update program that enables independent updating, among the plurality of update programs, and when the plurality of the first programs and the second program scheduled to be downloaded are not present in the storage unit, if a free memory region at present is smaller than a total data size of the plurality of the first programs and the second program scheduled to be downloaded, the receiving comprises receiving the plurality of the first programs to be downloaded, before receiving the second program, and receiving the second program scheduled to be downloaded, after transmitting, in the transmitting, each of the plurality of the first programs scheduled to be downloaded, to a corresponding control device of the plurality of control devices, updating each of the plurality of control devices by a corresponding first program of the plurality of the first programs scheduled to be downloaded, and deleting the plurality of the first programs stored in the storage unit.

7. A non-transitory computer readable storage medium storing a computer program for causing a computer to function as a relay device capable of performing in-vehicle communication with a plurality of control devices installed in a vehicle, the computer program causing the computer to perform operations comprising:

receiving a plurality of update programs for the control devices from an external device;

storing the received plurality of update programs;

transmitting the stored plurality of update programs to the corresponding control devices, respectively; and reserving a memory region of a storage unit for a plurality of first programs with priority over a memory region of the storage unit for a second program, wherein the plurality of the first programs are a plurality of update programs between which operation check after updating has been made, among the plurality of update programs, the second program is an update program that enables independent updating, among the plurality of update programs, and when the plurality of the first programs and the second program scheduled to be downloaded are not present in the storage unit, if a free memory region at present is smaller than a total data size of the plurality of the first programs and the second program scheduled to be downloaded, the receiving comprises receiving the plurality of the first programs to be downloaded, before receiving the second program, and receiving the second program scheduled to be downloaded, after transmitting, in the transmitting, each of the plurality of the first programs scheduled to be downloaded, to a corresponding control device of the plurality of control devices, updating each of the plurality of control devices by a corresponding first program of the plurality of the first programs scheduled to be downloaded, and deleting the plurality of the first programs stored in the storage unit.

8. A relay device capable of performing in-vehicle communication with a plurality of control devices installed in a vehicle, comprising:

a communication unit configured to receive a plurality of update programs for the control devices from an external device;

a storage unit configured to store therein the received plurality of update programs;

an in-vehicle communication unit configured to transmit the stored plurality of update programs to the corresponding control devices, respectively; and a processing unit configured to reserve a memory region of the storage unit for a plurality of first programs with priority over a memory region of the storage unit for a second program, wherein the plurality of the first programs are a plurality of update programs between which operation check after updating has been made, among the plurality of update programs, and the second program is an update program that enables independent updating, among the plurality of update programs, when the plurality of the first programs and the second program scheduled to be downloaded are not present in the storage unit, if a free memory region at present is smaller than a total data size of the plurality of the first programs and the second program scheduled to be downloaded, the processing unit causes the communication unit to execute preferential reception of the plurality of the first programs scheduled to be downloaded, and after each of the plurality of the first programs scheduled to be downloaded is transmitted by the in-vehicle communication unit to a corresponding control device of the plurality of control devices, each of the plurality of control devices is updated by a corresponding first program of the plurality of the first programs scheduled to be downloaded, and after the plurality of the first programs stored in the storage unit is subsequently deleted, the processing unit causes the communication unit to execute reception of the second program scheduled to be downloaded.

* * * * *